G. A. BADER.
EYEGLASS MOUNTING.
APPLICATION FILED NOV. 17, 1915.
1,278,418.
Patented Sept. 10, 1918.
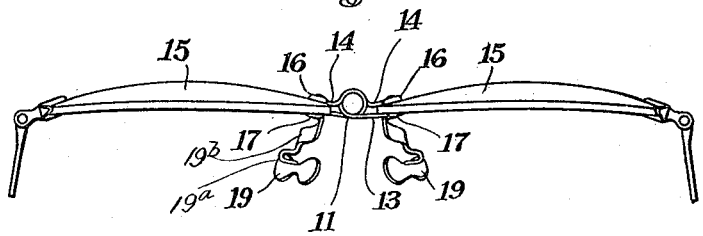
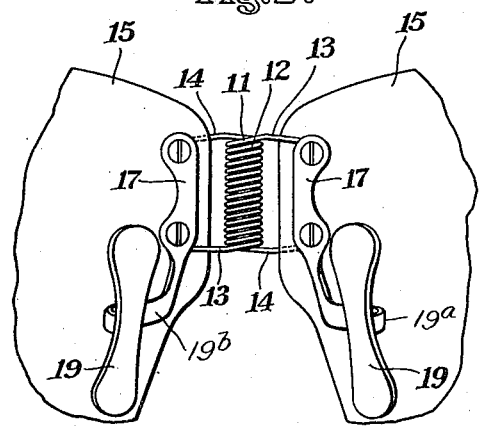
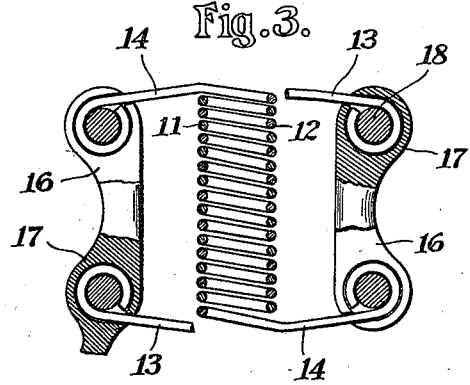
Inventor:
Gustav A. Bader
by his attorneys
Davis & Dorsey

UNITED STATES PATENT OFFICE.

GUSTAV A. BADER, OF ROCHESTER, NEW YORK.

EYEGLASS-MOUNTING.

1,278,418. Specification of Letters Patent. Patented Sept. 10, 1918.

Original application filed April 14, 1915, Serial No. 21,313. Divided and this application filed November 17, 1915. Serial No. 62,050.

*To all whom it may concern:*

Be it known that I, GUSTAV A. BADER, a citizen of the United States, and resident of Rochester, in the county of Monroe and State of New York, have invented certain new and useful Improvements in Eyeglass-Mountings, of which the following is a specification.

This invention relates particularly to the means for connecting the lenses in a rimless eyeglass-mounting, particularly in a mounting of the type employed as goggles, in which the lenses are large and irregular in shape.

It is customary, in eyeglass-mountings of the rimless type, to secure each lens to the bridge or other connecting-member by making a single perforation in the margin of the lens, and securing the lens in a clip by means of a screw, or other fastening, which passes through the perforation. Since this screw does not, by itself, prevent a pivotal movement of the lens, it is usual also to provide the clip with means engaging the edge of the lens to prevent it from swinging about the screw. This construction is unsatisfactory, partly because it is difficult to keep the parts tight, and partly because the lens frequently breaks where it is weakened at the point of perforation.

The object of the present invention is to produce an arrangement in which the mode of attachment of the lenses to the bridge or connecting-member is such as to secure greater rigidity against relative movements, and also to diminish the liability of breakage of the lenses. To this end I propose to employ, in place of the single perforation usually provided at or about the horizontal axis of the lense, two perforations spaced apart vertically at a substantial distance. In place of the usual clip which embraces the edge of the lens, I provide, in my improved construction, clamp-plates which lie against or adjacent to the opposite surface of the lenses, and are fixed thereto by screws passing through the perforations, and the bridge or other connecting-member is fixed to the lenses by introducing its ends between the clamp-plates and the surfaces of the lenses.

While the construction above described is applicable more or less generally to eyeglass-mountings of the rimless type, it is particularly useful in connection with goggles in which a spring, or resilient connecting-member, is employed in place of the usual bridge; and a further feature of the invention resides in the provision, in the inner surfaces of the clamp-plates, of recesses or sockets suitably formed to receive the ends of such a spring, and to retain them against swinging movement about the connecting-screws, so as to provide the desirable rigidity of the connections in all directions.

In the accompanying drawings:—

Figure 1 is a plan-view of a pair of eyeglasses embodying the present invention;

Fig. 2 is a rear elevation, on a larger scale than Fig. 1, showing particularly the means for connecting the lenses of the eyeglasses; and Fig. 3 is an enlarged detail-view, with parts in vertical section, showing the clamping-plates and the connecting-springs with which they are associated.

The invention is illustrated as embodied in a pair of eyeglasses in which two helical springs 11 and 12 are employed as the means for connecting the lenses, these springs being intercoiled so that their coiled portions have normally a common axis. The springs are provided, respectively, with oppositely-projecting ends 13 and 14, one end of each spring being fastened to one lens 15 and the other to the other lens, so that each of the springs constitutes a resilient connection between the two lenses.

The clamp-plates characteristic of the present invention are employed in pairs, each pair comprising a plate 16 which lies in front of the lens, and a plate 17 which lies in the rear of the lens. These plates are connected by screws 18, which pass through perforations in the margins of the lenses. Each clamp-plate is provided, on the surface which is adjacent the lens, with a recess having a lateral outlet, as shown particularly in Fig. 3, the recess being shaped to receive the looped extremity of one of the springs, so that these extremities encircle the screws 18 and are closely clasped at all points by the clamp-plates. The recesses are of such a depth as to permit the clamp-plates to rest close to the surface of the lenses when the screws are tightened, but to subject the ends of the springs to a clamping pressure against the lenses. This arrangement is such that the ends of the springs, by their engagement with the recessed portions of the clamp-plates, are prevented from swinging vertically about the screws 18, while movement in all other directions is prevented by the engagement of the springs, on opposite sides, by the clamp-plates and the lenses. Accordingly, the resiliency of the spring-connection is restricted to that afforded by the coiled portions of the springs.

The nose guards 19 have arms proceeding therefrom and connected to the clamp or attaching plates 17. These arms are of novel construction and consist of looped portions 19$^a$ which may be bent to adjust the guards to different positions relatively to each other and to the lenses. From the looped portions, nose bearing portions 19$^b$ extend upwardly and forwardly and connect with the edges of the plates 17 so that the flat faces of the stock lie at angles to the flat faces of the plates, or, in other words, the portions 19$^b$ proceed downwardly from the plates 17 and lie in front of the guards 19 in positions to rest upon the nose of the wearer at the same time that the nose is engaged by the guards 19.

It will be apparent that the construction above described is particularly useful in connection with goggles of the kind having a flexible connection between the lenses, and that the use of two vertically separated perforations, through which the clamp-screws are passed, not only provides securely against swinging movements of the lenses about the screws in the planes of the lenses, but also distributes the strain to which the lenses are subjected, so that the liability of breakage at the perforated portions is greatly reduced. This arrangement also, since it requires the presence of no attaching means at the inner ends of the lenses, permits these ends to be brought as close together as may be desirable, and is thus especially applicable to goggles in which it is desirable to close, as far as possible, the space between the eyes and adjacent the bridge of the nose.

The peculiar form of spring-connection, between the lenses, which is hereinbefore described and illustrated in the accompanying drawings is not claimed herein, as it forms the subject-matter of an application for Letters Patent of the United States filed by me April 14, 1915, Serial No. 21,313.

It will be apparent that while the invention has been described as employed in connection with springs of a certain form, it is not limited to such embodiment, but may be embodied in various other forms within the nature of the invention as it is defined in the following claims.

I claim:—

1. The combination with a pair of lenses, each provided with two openings spaced from the adjacent edge of the lens, one above the other, a pair of separate clamp plates for each lens lying out of contact with the edge of the lens, each plate having two openings, connecting means between the lenses having each side lying between a clamp plate and one of the lenses and provided with two openings, and two fasteners passing through each lens, a pair of plates and the connecting means.

2. The combination, with a pair of lenses, of a spring provided with looped ends, clamp-plates fixed to the surfaces of the lenses and recessed adjacent said surfaces to receive the looped ends of the spring, the recesses having lateral outlets through which the spring extends to prevent turning of the ends relatively to the clamp-plates, and screws passing through the clamp-plates and the lenses and through said looped ends of the spring.

3. Eyeglasses comprising a pair of lenses, a connection between the lenses, means for attaching said connection to the lenses, and guards having adjustable arms proceeding downwardly from said attaching means, and having portions arranged in a position to bear on the nose of the wearer in front of the guards and also having loop portions by which the guards may be adjusted relatively to the nose bearing portions of the arms.

4. In combination with a pair of lenses and a connection between the lenses permitting relative movement thereof, of a pair of guards and a pair of supporting arms for the guards each arm being connected to a lens to move therewith and having a looped portion, and a nose bearing portion proceeding upwardly from the looped portion to rest on the nose of a wearer in advance of the guards.

5. In eyeglasses, a pair of lenses, a pair of nose guards for supporting the lenses on the nose, and a pair of supporting arms for the guards, each arm having a looped portion connecting with the guard and a nose bearing portion proceeding upwardly from the loop portion to rest on the nose of the wearer.

GUSTAV A. BADER.